United States Patent [19]

Jones

[11] 3,720,929

[45] March 13, 1973

[54] MAGNETIC CORE MEMORIES

[75] Inventor: Ralph Edwin Jones, London, England

[73] Assignee: Thorn Electrical Industries Limited, London, England

[22] Filed: March 19, 1971

[21] Appl. No.: 126,058

[30] Foreign Application Priority Data

March 20, 1970 Great Britain....................13,738/70

[52] U.S. Cl. .....340/174 PA, 340/174 A, 340/174 M, 340/174 YC, 315/312

[51] Int. Cl............................G11c 5/02, G11c 11/06

[58] Field of Search .340/174 PA, 174 DM; 315/312, 315/313, 314, 315

[56] References Cited

UNITED STATES PATENTS 3,321,749 5/1967 Overn............................340/174 PA

*Primary Examiner*—James W. Moffiti

*Attorney*—Kemon, Palmer & Estabrook

[57] ABSTRACT

In a magnetic core memory non-destructive read-out is achieved by a read pulse of insufficient amplitude to reset the core to the O state while of sufficient amplitude to induce a significant output for a core in the 1 state, which is preferably not fully saturated. Digital information read out from a matrix memory can be amplitude modulated by varying the amplitude of the read pulses. The memory can be used to control a stage lighting system, the amplitude modulation controlling fades and cross-fades.

14 Claims, 6 Drawing Figures

Inventor
RALPH EDWIN JONES
By Kemon, Palmer & Estabrook
Attorneys

MAGNETIC CORE MEMORIES

This invention relates to magnetic core memories using what are commonly called "square loop cores," i.e. small rings of ferromagnetic material with a hysteresis loop which approximates a rectangle. The use of such cores in memories, particularly matrix memories with selecting conductors arranged on a coordinate principle, is very well known. The two remanent states of a core are identified as "0" and "1," i.e. each core stores one bit of information. The remanent flux circulates in the core in the two opposite senses in the "0" and "1" states respectively.

In order to read out the bit stored in a core, it is forced to the "0" state. If it was in the "1" state a pulse is induced in a sense winding linking the core. If it was in the "0" state already no such pulse is induced. Readout is therefore inherently destructive of the stored information and so-called non-destructive readout is only achieved by the provision of circuitry which immediately writes a "1" back into the core when a "1" is read out. This complicates the memory and the main object of the present invention is to provide a simpler system in which readout is inherently non-destructive.

According to the present invention there is provided a magnetic core memory comprising at least one square loop core, a write circuit coupled thereto for selectively setting the core to a first state in which the remanent flux circulates in one sense and is not substantially less than the saturation flux and a second state in which the remanent flux circulates in the other sense, and a sense winding and a read circuit coupled to the core, the read circuit being operative to apply a read current pulse by way of one or more conductors linking the core which pulse is of the sense tending to switch the core from the second state to the first state but is of insufficient magnitude actually to switch the core and induces a substantially greater pulse in the sense winding when the core is in the second state than when the core is in the first state.

It will be understood that the read current pulse can be a pulse carried by a single conductor or can be carried by two or more conductors linking the core.

In the first state, which will be called the "0" state for convenience of further description, it is required that the remanent flux shall not be substantially less than the saturation flux. This is in order that the read pulse shall be incapable of inducing a substantial output pulse in the sense winding. There is no such limitation in respect of the second state, called the "1" state and indeed it is preferred that the remanent flux in the "1" state shall be somewhat less than the saturation flux for the reason that the core will then be at a point where the slope of the B–H characteristic is steeper. Because of this the read pulse, which drives the flux further away from saturation, will induce an increased output pulse enhancing the discrimination between the "0" and "1" states. Techniques for achieving the required remanent flux in the "1" state and other techniques for enhancing the discrimination are described below.

The memory can be used in a digital computer, in which case the output pulses in the sense windings are required to assume only two different values, signifying "0" and "1" respectively. However there are special applications in which a further property of the memory is valuable, namely that there is a useful range in which the magnitude of the "1" output pulse varies approximately linearly with the magnitude of the read pulse. It is thus possible to read a binary word out of an address location, modulated by a multiplying factor. Furthermore if two address locations share sense windings for parallel readout of the bits of a word it is possible to mix the two words in a selected proportion by corresponding selection of the magnitudes of the read pulses pertaining to the two addresses respectively. By reducing read pulses from full to zero amplitude at one address while increasing the pulses from zero to full amplitude at the other address, a smooth "cross-fading" transition from one word to the other will be effected. The application of this to the control of theater or studio lighting is described below.

Further description of the invention, by way of example, will be given with reference to the accompanying drawings, in which.

Figure 1:
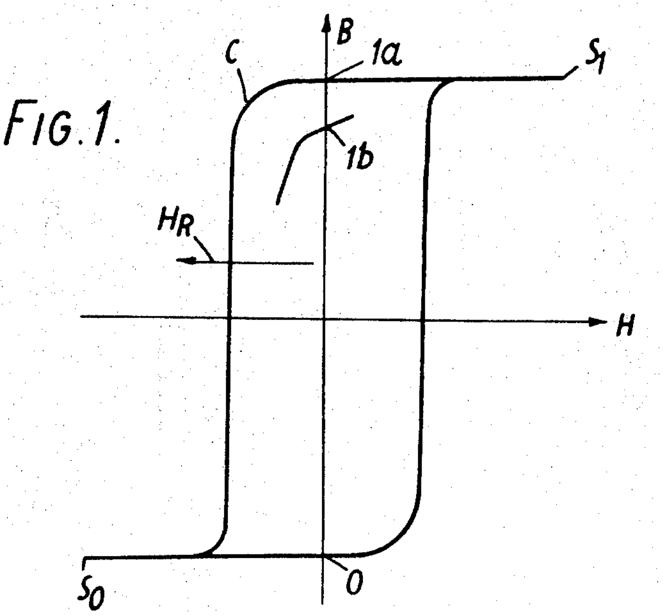
FIG. 1 is an explanatory diagram of a rectangular hysteresis loop.

FIG. 1 shows the familiar B–H or hysteresis loop of a square loop core with the two remanent points identified with binary "0" and "1" labelled O and 1*a*. Because the top and bottom portions of the loop have such a small slope, the remanent fluxes are only a little smaller in magnitude than the corresponding saturation fluxes $S_o$ and $S_1$. In conventional core memories readout is accomplished by applying a read field $H_R$ of sufficient magnitude to switch the core from remanent point 1*a* to point O. However, in performing the present invention $H_R$ is reduced so that switching does not take place. If the core is at O, $H_R$ will move the core towards $S_o$ but the change in B will be very small because of the small slope of the loop between O and $S_o$. If the core is at 1*a*, $H_R$ moves the core away from $S_1$ and, provided $H_R$ is large enough to move the core on to the curved part C of the loop, an appreciable flux change will occur, inducing an appreciable output pulse in a sense winding.

Although the invention can be carried out using this intermediate value of $H_R$ it is preferred to operate somewhat differently by altering the remanent state corresponding to binary "1" from the point 1*a* to a point 1*b* on an inner loop which is shown fragmentarily. As is well known the slope at point 1*b* is substantially greater than at 1*a*. Therefore it is possible to obtain a useful discrimination between the "0" and "1" states with much smaller values of $H_R$. What is more, a reasonably linear relationship between the magnitude of $H_R$ and the change in B can be achieved.

Experiments have shown that a good position for the point 1*b* is the so called "read distrubed" flux which is obtained in conventional core memories when a full write pulse is followed by a half read pulse. It will be appreciated that the "0" state must remain at the point 0; otherwise $H_R$ could induce an appreciable output pulse in the "0" state and the amplitude discrimination between "0" and "1" would be lost.

Figure 2B:
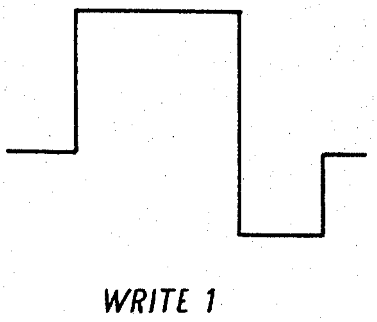
FIGS. 2*a*, 2*b* and 2*c* show explanatory waveforms.
Figure 2A:
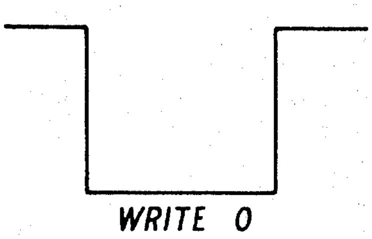
Figure 2C:
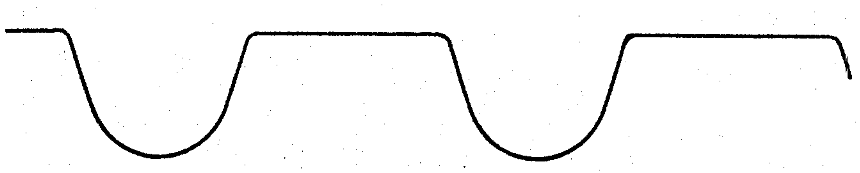
Figure 2:
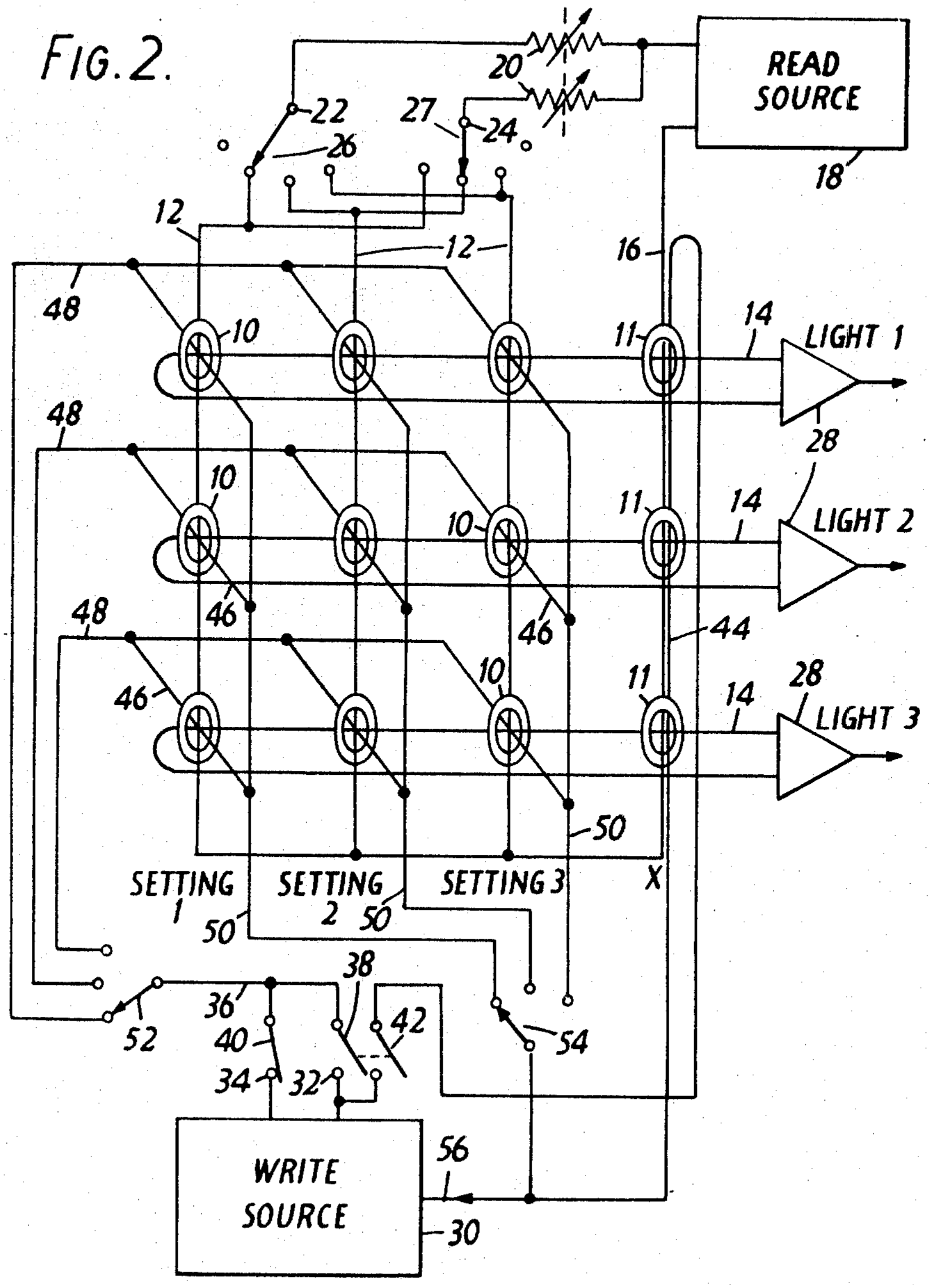
FIGS. 2 and 3 are schematic circuit diagrams of two embodiments of the invention.

The embodiment of the invention shown in FIG. 2 is a very simplified form of a circuit for controlling stage or studio lighting. No attempt has been made in this or FIG. 3 to show the senses in which cores are linked. A matrix of cores 10 (in practice a much larger matrix would be required) is arranged in rows which correspond to different lights and columns which correspond to different lighting settings with an extra column of cores 11 labelled X. Three rows are shown labelled light 1, light 2 and light 3 and three columns are shown labelled setting, 1, setting 2, setting 3. The columns constitute memory address locations storing three-bit words. The word 101 for example means "lights 1 and 3 ON; light 2 OFF."

The cores are linked column-wise by read conductors 12 and row-wise by sense conductors. The sense conductors also link the cores 11 which are linked by a column conductor 16. A read current source 18 has one terminal connected to two ganged rheostats 20 which operate in complementary fashion so that, if the read pulse amplitude at terminal 22 of one rheostat is $x$, the amplitude at the terminal 24 of the other rheostat is $1-x$ (the maximum read pulse amplitude being 1). Read selector switches 26 and 27 enable any read conductor 12 to be connected to either terminal 22 or 24. The other ends of the read conductors are connected together and return via the conductor 16 to the other terminal of the read current source 18, which provides trains of read pulses at a suitable frequency.

The sense conductors 14 are connected to corresponding amplifier 28 whose outputs are used in a manner known per se to control the intensities of lights 1, 2 and 3.

In order to write words into the address locations (settings 1, 2 and 3) a write current source 30 provides "write 0" and "write 1" pulse waveforms, illustrated in FIGS. 2*a* and 2*b* respectively, on terminals 32 and 34 respectively. Either terminal 32 or 34 can be connected to a line 36 by means of a corresponding switch 38 or 40. The switch 38 is ganged to a switch 42 for applying the "write 0" pulse to a conductor 44 linking the cores 11. Alternatively the "write 0" and "write 1" current pulses applied to the line 36 can be returned through the conductor 44, the switching being so arranged that all such pulses appear as "write 1" pulses to the cores 11.

The cores 10 are linked by individual write windings 46 which are connected at one end to row write conductors 48 and at the other end to column write conductors 50. A light selector switch 52 enables the line 36 to be connected to any row write conductor 50. A setting selector switch 54 enables any column write conductor 52 to be connected to the return terminal 56 of the write current source 30.

The circuit operates as follows: The setting selector switch 54 is first positioned as shown to select setting 1 and the light selector switch 52 is set to each of its positions in turn. In each position either the switch 38 or 40 is closed to write a "0" or "1" in the corresponding core depending on whether the light is to be OFF or ON in setting 1. As drawn the switches are set for writing a "1" in the core pertaining to light 1 in setting 1.

When the switch 38 is closed a negative-going current pulse, shown in FIG. 2*a* flows through the write winding 46 of the selected core and is of sufficient magnitude to set the core to point 0 in FIG. 1, even if the core was previously at point 1*b*. Switch 42 applies the same pulse to the conductor 44 which ensures that the cores 11 are always kept at the point 0. When, on the other hand, the switch 40 is closed, a positive-going current pulse, shown in FIG. 2*b* flows through the write winding 46 of the selected core and is of sufficient magnitude to set the core to point 1*a* of FIG. 1, even if it was previously at point 0. This pulse does not influence the cores 11. As shown in FIG. 2*b* the positive-going "-write 1" pulse terminates with a negative-going portion of reduced amplitude. This leaves the core at point 1*b*, not being of sufficient amplitude to switch the core to point 0.

When the cores for setting 1 have been set as required the setting selector switch 54 is moved on and the cores are set as required for settings 2 and 3. The information, representing a sequence of lighting settings in thus written into the memory. When readout is to be effected, i.e. the lights are actually to be controlled in accordance with this information, the switches 26 and 27 are positioned as shown. The switch 26 selects setting 1 for current readout and switch 27 selects setting 2 for subsequent readout. The rheostats 20 are set to one extreme giving maximum amplitude read pulses on terminal 22 and negligible amplitude read pulses on terminal 24.

The read pulses can take the form shown in FIG. 2*c*, namely half-wave rectified AC. Alternatively full-wave rectified AC could be used or pulses of a different waveform. In any event the pulses are of such maximum amplitude as to be incapable of switching core from point 1*b* (FIG. 1) to point 0, as already described. The pulses in the read conductor 12 pertaining to setting 1 induce pulses in the sense conductors 14 whose cores are in state "1." Smaller, spurious pulses will also be induced in the conductors 14 whose cores are in state "0" because the slope of the hysteresis loop at point 0 is not completely zero. The presence of these spurious pulses would mar the discrimination between the "0" and "1" states and it is for this reason that the cores 11 in column X are provided. The read pulses return through the conductor 16 linking these cores and induce spurious pulses in the conductors 14. These spurious pulses are arranged to be of opposite polarity to those induced via the cores 10. Therefore the net current into the amplifier 28 whose core 10 in the selected setting is in the "0" state is substantially zero and discrimination is greatly enhanced. The appreciable current provided at the output of an amplifier 28 whose core 10 is in the "1" state is used to switch ON the corresponding light (or bank of lights).

The ganged rheostats 20 enable a smooth cross-face from setting 1 to setting 2 to be achieved by adjustment thereof to the opposite extreme in which maximum amplitude read pulses appear on terminal 24 instead of terminal 22, negligible pulses appearing now on this latter terminal. It is arranged that the net current into the amplifier 28 for any light whose cores 10 in both of settings 1 and 2 are in the "1" state remains constant, the rheostats 20 being tailored if need be to achieve this. This will avoid any rise or dip effect during the cross-fade. The intensities of the lights are controlled by the mean output currents of their amplifiers 28. A subsequent cross-fade to setting 3 can be achieved by leaving switch 27 as it is, positioning switch 26 to select setting 3 and then adjusting the rheostats 20 back to their original extreme setting.

Rheostats and switches for effecting cross-fading have been described as one example of the potentialities of the invention. Obviously these provisions could be extended and modified as required to enable individual settings to be faded in. Entirely different circuits could be devised for controlling the amplitude of the read pulses.

Figure 3:
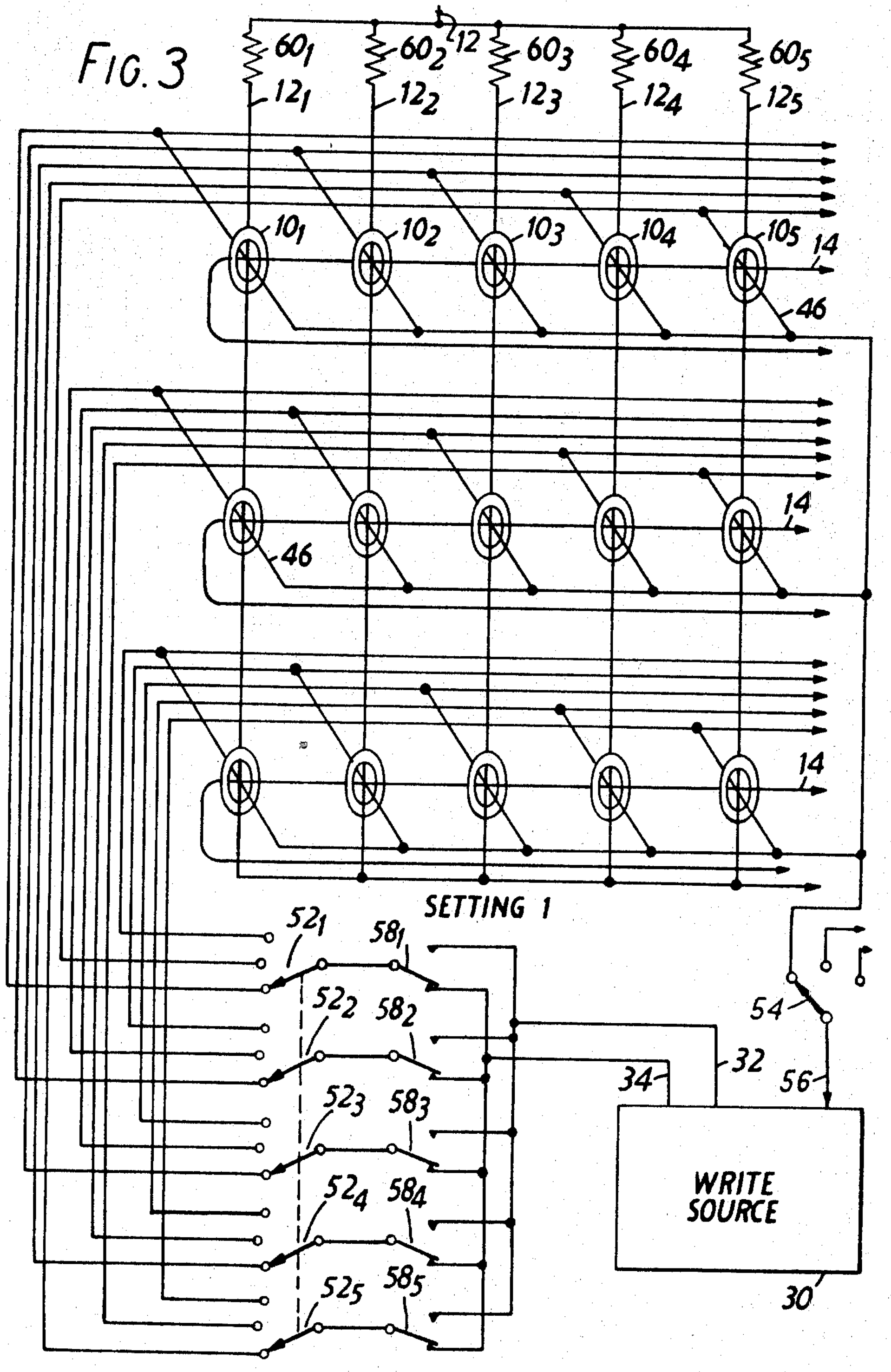

Although the circuit of FIG. 2 allows a complete lighting setting to be faded, within the setting each light is either ON or OFF. There is no possibility of adjusting the relative intensities of the lights. FIG. 3 shows one way in which this may be achieved. FIG. 3 shows the equivalent of only one column of the cores 10 in FIG. 2. Each core 10 is replaced by five cores $\mathbf{10_1}$ to $\mathbf{10_5}$ which are used to specify a light intensity on a scale from 0 to 31. An example was given above in relation to FIG. 2 of the word 101 specifying lights 1 and 3 ON and light 2 off. In the embodiment of FIG. 3 a corresponding example might be 111110000010001 which specifies that light 1 is fully ON, light 2 is OFF and light 3 is ON at intensity level 17.

Referring then to FIG. 3 the 3 × 5 cores for setting 1 are shown, with the switch 54 positioned to select this setting. The switch 52 is replaced by five ganged switches $\mathbf{52_1}$ to $\mathbf{52_5}$ for selecting the five cores corresponding to one light. As shown the top row of five cores, corresponding to light 1, are selected. Since it is necessary to write a "1" or "0" selectively in each of these five cores the switches 38 and 40 are replaced by five individually operable changeover switches $\mathbf{58_1}$ to $\mathbf{58_5}$ for connecting either the "write 1" terminal 34 or the "write 0" terminal 32 to the common terminal of the corresponding switches $\mathbf{52_1}$ to $\mathbf{52_5}$. The switches $\mathbf{58_1}$ to $\mathbf{58_5}$ are shown set for writing a "1" in every one of the five cores pertaining to light 1.

In practice the setting of the five switches $\mathbf{58_1}$ to $\mathbf{58_5}$ in accordance with a five-bit binary code might be very tedious and these switches could be replaced by a 32-position, five-level rotary switch wired to connect the terminals 32 and 34 to the switches $\mathbf{52_1}$ to $\mathbf{52_5}$ in accordance with the binary codes for the positions 0 to 31 thereof.

So far as readout is concerned, the readout conductor 12 is branched into five readout conductors $\mathbf{12_1}$ to $\mathbf{12_5}$ pertaining to the cores $\mathbf{10_1}$ to $\mathbf{10_5}$ respectively. Furthermore these conductors include resistors $\mathbf{60_1}$ to $\mathbf{60_5}$ which weight the read pulses therein in the relative magnitudes of 1, one-half, one-fourth, one-eighth and one-sixteenth. If therefore the cores $\mathbf{10_1}$ to $\mathbf{10_5}$ for any light are set to the binary code representing a number N ($N<32$) it will be seen that the total current induced in the corresponding sense wire 14 will be N/32 times the maximum possible current. Thus the relative intensities of lights 1, 2 and 3 can be established. It is still, of course, possible to adjust the amplitude of the pulses in the conductor 12, as described in relation to FIG. 2 in order to superimpose an overall fade.

It will be appreciated that the circuits described illustrate only some of the numerous variations which are possible within the scope of the invention. Such variations will be dictated to some extent by the particular application to which the invention is put. If, for example, the memory were used in a digital computer rather than a lighting control circuit, no provision for superimposing an amplitude modulation on the digital readout would be appropriate and an entirely different organization of read, write and sense conductors could be required. In particular each core could be linked by two read conductors and/or two write conductors to enable reading and writing to be effected using half-read, or half-write pulse to select cores in a manner well known per se. A single sense winding could link all cores in a memory plane, though it is a particular advantage of the invention that parallel readout of a complete word (as in the described embodiments) is readily achieved. In contrast non-destructive parallel readout of a conventional memory requires a separate re-write circuit for every bit of a word.

As described, establishment of the point 1*b* (FIG. 1) is achieved by using a "write 1" waveform of special form (FIG. 2*b*). However separate pulses may be used to set initially to point 1*a* and then to point 1*b*. In particular the read pulses themselves can be used to establish the point 1*b* if these are applied during the write operation and the "write 1" pulse is synchronised to occur between two read pulses.

It will be appreciated that simple electromechanical switching arrangements have been shown and described in order to present the principles of the invention clearly. Obviously more sophisticated switching can be employed, particularly using solid state switching devices encoded to yield the required functions.

I claim:

1. A magnetic core memory comprising a plurality of cores arranged in a matrix wherein a plurality of groups of cores correspond to words of information, a write circuit coupled to the cores for selectively setting each core to a first state in which the remanent flux circulates in one sense and is not substantially less than the saturation flux and a second state in which the remanent flux circulates in the other sense and is less than the saturation flux, at least one sense winding, each of which links at least one core from each group, a plurality of read conductors linking the cores of the said groups respectively, a read circuit coupled to the matrix by way of the read conductors, the read circuit being adapted to furnish a continuing succession of read pulses in any selected read conductor for generating a correspondingly continuing signal in the sense windings of cores in the second state, which pulses are of the sense tending to switch a core from the second state to the first state but are of insufficient magnitude actually to switch a core and induce a substantially greater pulse in a sense winding when a core is in the second state than when a core is in the first state, and means for varying the amplitude of the read pulses, thereby to amplitude-modulate the digital information read out from a group of cores.

2. A magnetic core memory according to claim 1, comprising means for reducing the amplitude of the read pulses applied to one selected group while simultaneously increasing the amplitude of the read pulses applied to another selected group.

3. A magnetic core memory according to claim 1, wherein the cores in each group are divided into a plurality of sets, the cores in each set being linked by the same sense winding individual to the set and the read circuit being adapted to apply read pulses of different amplitudes simultaneously to all cores in a set.

4. A magnetic core memory according to claim 3, wherein the relative values of the said different amplitudes form a binary progression.

5. A magnetic core memory according to claim 1, wherein the remanent flux in the second state corresponds to the "read disturbed" flux.

6. A magnetic core memory according to claim 1, wherein the second state is established by a write waveform comprising a current pulse of sufficient amplitude to substantially saturate the core with the flux circulating in the said other sense, followed by a current pulse of opposite polarity and smaller amplitude, insufficient to switch the core to the first state.

7. A magnetic core memory according to claim 1, comprising a further core maintained in the first state and to which a read current pulse is applied when such a pulse is applied to a group of the first mentioned cores, and means for subtracting the signal induced in the sense winding of the further core from the signal induced in the sense windings of the group of cores.

8. A magnetic core memory according to claim 1, wherein the succession of read pulses is a half-wave rectified a.c. signal.

9. A lighting control system comprising a magnetic core memory according to claim 1, and a plurality of intensity control circuits for corresponding lights or banks of lights, each such circuit being responsive to a corresponding sense winding of the memory.

10. A magnetic core memory according to claim 1, wherein the second state is established by a write pulse of sufficient amplitude to substantially saturate the core with the flux circulating in the said other sense, followed by a read current pulse.

11. A lighting control system comprising a plurality of intensity control circuits for controlling lights or banks of lights, a matrix of square loop cores arranged in groups corresponding to different lighting settings, a write circuit for selectively setting each core individually to a first state in which the remanent flux circulates in one sense and is not substantially less than the saturation flux and a second state in which the remanent flux circulates in the other sense, a plurality of sense windings each of which links at least one core from each group and is coupled to a corresponding intensity control circuit for supplying a pulsating control signal thereto, a read circuit coupled to each group of cores for applying a pulsating read signal to all the cores of any selected group, and means for varying the amplitude of the pulses of the read signal up to an upper limit for correspondingly varying the amplitude of each pulsating control signal induced in a sense winding, and pulses tending to switch the cores from the second state to the first state and said upper amplitude limit being insufficient actually to switch the core.

12. A lighting control system according to claim 11, wherein the said means for varying are adapted to reduce the amplitude of the read signal applied to one group of cores while simultaneously increasing the ampliture of the read signal applied to one group of cores while simultaneously increasing the amplitude of the read signal applied to another group of cores.

13. A lighting control system according to claim 11, wherein the cores in each group are divided into a plurality of sets, the cores in any set being linked by the same sense winding, and the read circuit being adapted to apply read signals of different amplitudes not exceeding the said upper limit simultaneously to all cores in a set.

14. A lighting control system according to claim 13, wherein the relative values of the said different amplitudes form a binary progression.

* * * * *